(12) United States Patent
Luciano, III

(10) Patent No.: US 7,212,520 B2
(45) Date of Patent: May 1, 2007

(54) NET-AWARE TELEPHONE SWITCH

(75) Inventor: Frank John Luciano, III, Billerica, MA (US)

(73) Assignee: International Business Machines for Corporation, Armonk, NY (US)

(*) Notice: Subject to any disclaimer, the term of this patent is extended or adjusted under 35 U.S.C. 154(b) by 937 days.

(21) Appl. No.: 10/076,578

(22) Filed: Feb. 13, 2002

(65) Prior Publication Data

US 2003/0152066 A1    Aug. 14, 2003

(51) Int. Cl.
*H04L 12/66* (2006.01)

(52) U.S. Cl. .................... 370/352; 370/401; 370/356

(58) Field of Classification Search ............ None
See application file for complete search history.

(56) References Cited

U.S. PATENT DOCUMENTS

| | | | |
|---|---|---|---|
| 4,621,358 A | 11/1986 | Jotwani | 370/56 |
| 4,736,406 A | 4/1988 | Molnar | 379/94 |
| 4,972,457 A | 11/1990 | O'Sullivan | 379/59 |
| 5,652,866 A | 7/1997 | Aldred et al. | 395/500 |
| 5,867,660 A | 2/1999 | Schmidt et al. | 395/200.57 |
| 5,961,608 A | 10/1999 | Onosaka et al. | 709/249 |
| 5,966,649 A | 10/1999 | Gulliford et al. | 455/408 |
| 5,995,831 A | 11/1999 | Gulliford et al. | 455/426 |
| 5,999,512 A | 12/1999 | Furuta | 369/275.1 |
| 6,069,890 A | 5/2000 | White et al. | 370/352 |
| 6,111,873 A | 8/2000 | Mandalia et al. | 370/352 |
| 6,188,762 B1 | 2/2001 | Shooster | 379/265 |
| 6,205,135 B1* | 3/2001 | Chinni et al. | 370/356 |
| 6,256,389 B1 | 7/2001 | Dalrymple et al. | 379/900 |
| 6,259,774 B1 | 7/2001 | Miloslavsky | 379/90.01 |
| 6,614,802 B1* | 9/2003 | Garland et al. | 370/465 |
| 6,618,368 B1* | 9/2003 | Tanigawa et al. | 370/352 |
| 6,904,038 B1* | 6/2005 | Moon et al. | 370/353 |
| 6,944,151 B1* | 9/2005 | Menard | 370/353 |
| 6,954,454 B1* | 10/2005 | Schuster et al. | 370/352 |
| 2002/0114439 A1* | 8/2002 | Dunlap | 379/219 |

FOREIGN PATENT DOCUMENTS

| | | |
|---|---|---|
| EP | 1087601 A2 | 3/2001 |
| JP | 11341073 A | 12/1999 |
| JP | 200286952 | 10/2000 |
| WO | WO0065778 | 11/2000 |

OTHER PUBLICATIONS

Research Disclosure "LAN Connect Conference Phone", No. 421109 p. 693, May 1999.
Research Disclosure "Customer Premises Equipment Providing Wireless Access to Consolidated Broadband Services", No. 428118 p. 1682, Dec. 1999.

* cited by examiner

*Primary Examiner*—Bob A. Phunkulh
(74) *Attorney, Agent, or Firm*—Pastel Law Firm; Christopher R. Pastel

(57) ABSTRACT

A net-aware telephone switch enabling a user to receive or send calls from/to both the Internet and the PSTN comprises a two-line switch connecting with the communication terminal for switching the outgoing call between IP call mode and PSTN call mode; a CPU, operated for sending out an IP call and receiving an IP call to/from the outside; a storage, for storing programs and data required for sending out or receiving the IP call; a connector for connecting the net-aware telephone switch with the Internet; and a bus for connecting all the above components with each other and for transferring data among them.

14 Claims, 18 Drawing Sheets

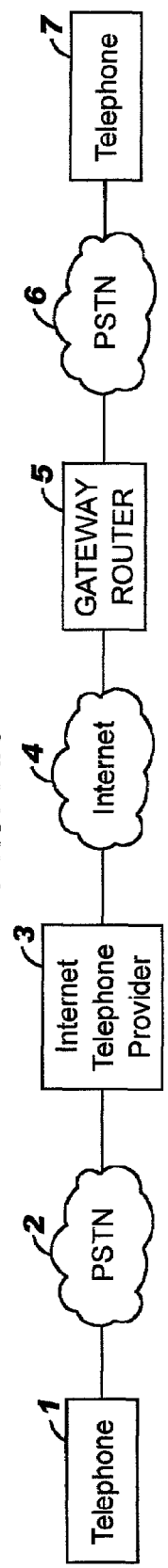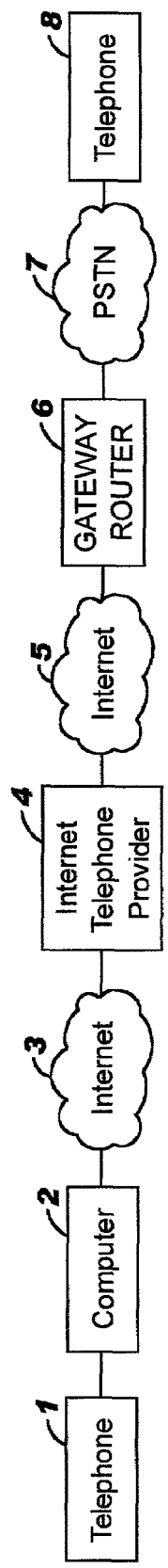

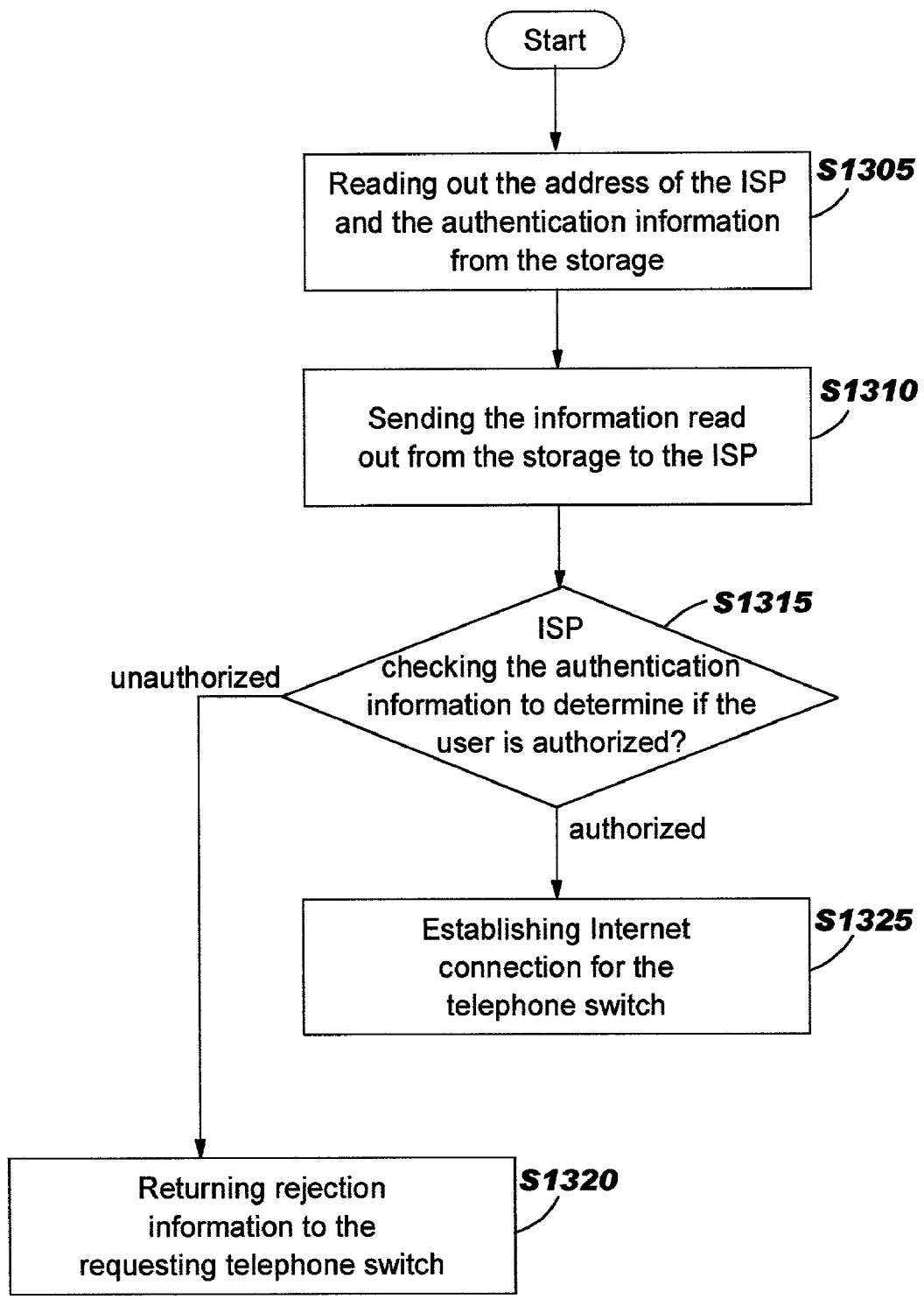

NET-AWARE TELEPHONE SWITCH

FIELD OF THE INVENTION

The present invention relates to a net-aware telephone switch which provides Internet telephone service for users of the Public Service Telephone Network (PSTN).

BACKGROUND OF THE INVENTION

With the fast development of the Internet, it is common to provide telephone service for users via the Internet. There are two popular ways in the prior art to provide IP phone service for users. As shown in FIG. 1, in this first mode, the user of the telephone 1 sends a request for dialing an IP phone call to the user of the phone 7 to an Internet Telephone Provider (ITP) 3 via the PSTN 2, for example, by dialing a special service number such as 17930 to connect with the ITP 3. Then, the user of the telephone 1 inputs the number of the telephone 7 according to the prompt of the ITP 3. The ITP 3 then establishes an Internet link 4 between itself and the gateway router 5 of the PSTN 6 accessed by the phone 7. The users of the telephone 1 and the telephone 7 can now talk with each other through the path as shown in FIG. 1.

However, in this mode, the Internet connection is established between the ITP 3 and the gateway router 5, and the connection between the phone 1 and the ITP 3 is still though PSTN 2. In addition, operations such as data format conversions are executed at the ITP 3 and the gateway router 5. Therefore, the cost of IP phone service is rather high.

The other popular mode is shown in FIG. 2. The difference between this mode and that shown in FIG. 1 is that the Internet connection 3 is established between the computer 2 at the telephone 1 and the ITP 4. The telephone 1 directly dials an IP phone call to the telephone 8 though the Internet connection. The cost in this latter mode is low. However, the computer 2 is necessary at the telephone end as an access device to the Internet. Therefore, the hardware cost is high in this mode.

SUMMARY OF THE INVENTION

An object of the invention is to provide a net-aware telephone switch enabling an ordinary user of the PSTN to receive or send IP phone calls via the Internet without access to a computer.

Another object of the invention is to provide a net-aware telephone switch through which a user can receive or send calls from/to both the Internet and the PSTN.

Yet another object of the invention is to provide a net-aware telephone switch with high security.

A further object of the invention is to provide a portable net-aware telephone switch as a turnkey device which is easy to operate.

The invention provides a net-aware telephone switch providing IP phone service for a user of a communication terminal of the PSTN, comprising: a 2-line switch connecting with the communication terminal for switching the outgoing call between the IP phone mode and the PSTN phone mode; a CPU, operated for sending out an IP call and receiving an IP call to/from the outside; a storage, for storing the programs and data required for sending out or receiving the IP call; a connector for connecting the net-aware telephone switch with the Internet; a bus, for connecting all the above components with each other and for transferring data among them.

The invention provides a method for providing IP phone service for a user of a communication terminal, comprising steps:
Establishing a connection with an ISP and an ITP; Receiving an outgoing call signal input by the user through the communication terminal; Determining if the call signal includes information indicating that the outing call is an IP phone mode, and if the information is not included, routing the call signal to the PSTN, else setting the phone mode to the IP phone mode and providing IP phone service for the user through an ITP.

The net-aware telephone switch in the present invention connects a common telephone with a broadband network such as a cable network or DSL to enable a user to dial IP phone calls with high speed and low cost.

BRIEF DESCRIPTION OF THE DRAWINGS

FIG. 1 is the schematic diagram of an IP phone communication system in the prior art.

FIG. 2 is the schematic diagram of another IP phone communication system in the prior art.

FIG. 13 shows an exemplary flow chart of establishing connection with the ISP.

DETAILED DESCRIPTION

Figure 3:
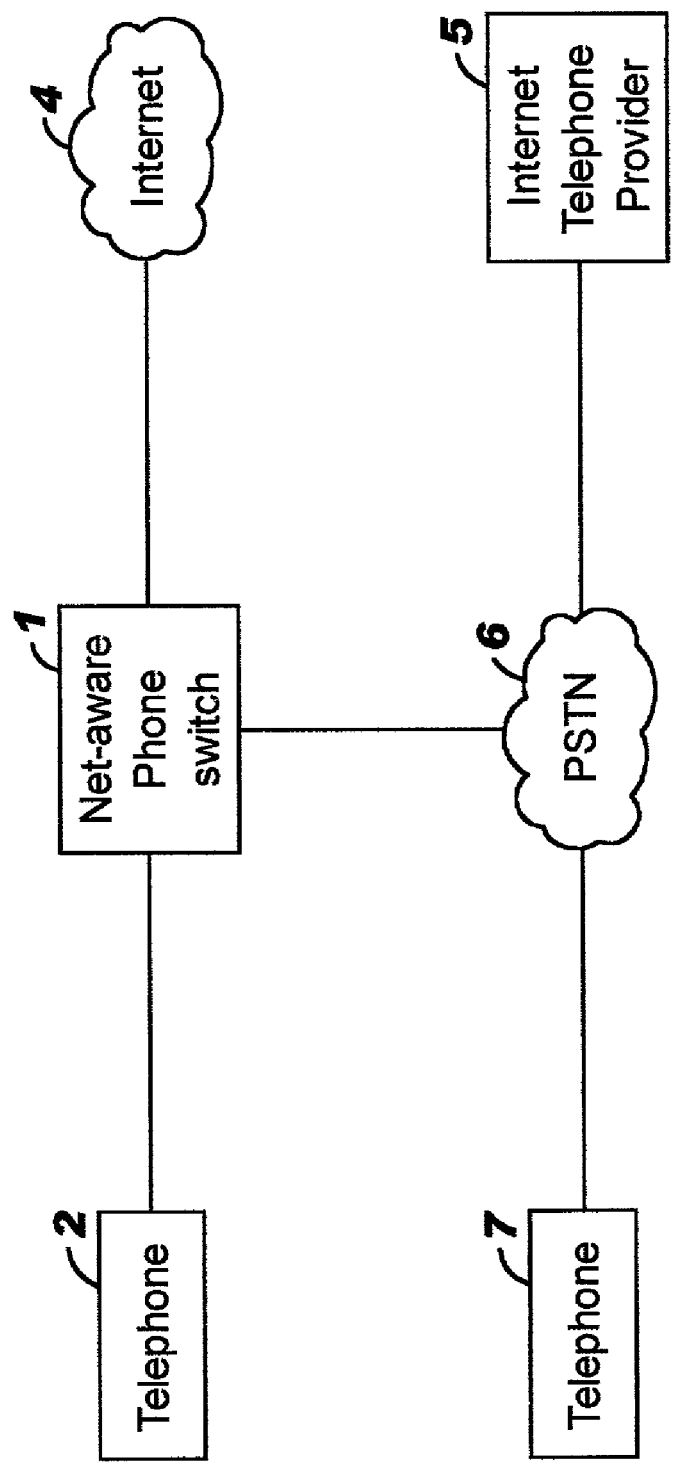
FIG. 3 is an exemplary block diagram of an IP phone communication system having the net-aware telephone switch according to the invention.

Referring to FIG. 3, there is shown an exemplary schematic block diagram of a telephone communication system having the net-aware telephone switch according to the invention. The telephone 2 connects with the net-aware telephone switch 1 according to the invention, which is able to link with the Internet 4. The ITP 5 is an Internet Telephone Provider (ITP) providing IP phone service, such as Net2Phone, Inc., Dialpad Communications, Inc. or MediaRing.comLTD/Inc., which provide IP phone service for users of the Internet. Net2Phone, Dialpad, and MediaRing-.com may be trademarks or registered trademarks of their respective corporations.

A path may be established in the following manner when the phone 2 dials an IP phone call to the phone 7:

Telephone 2→Net-aware telephone switch 1→Internet 4→ITP 5→PSTN 6→Telephone 7. Alternatively, a path may be established in the following manner when the phone 2 dials an ordinary phone call to the phone 7:

Telephone 2→Net-aware telephone switch 1→PSTN 6→Telephone 7.

The net-aware telephone switch 1 according to a first embodiment of the invention is described next.

Figure 4:
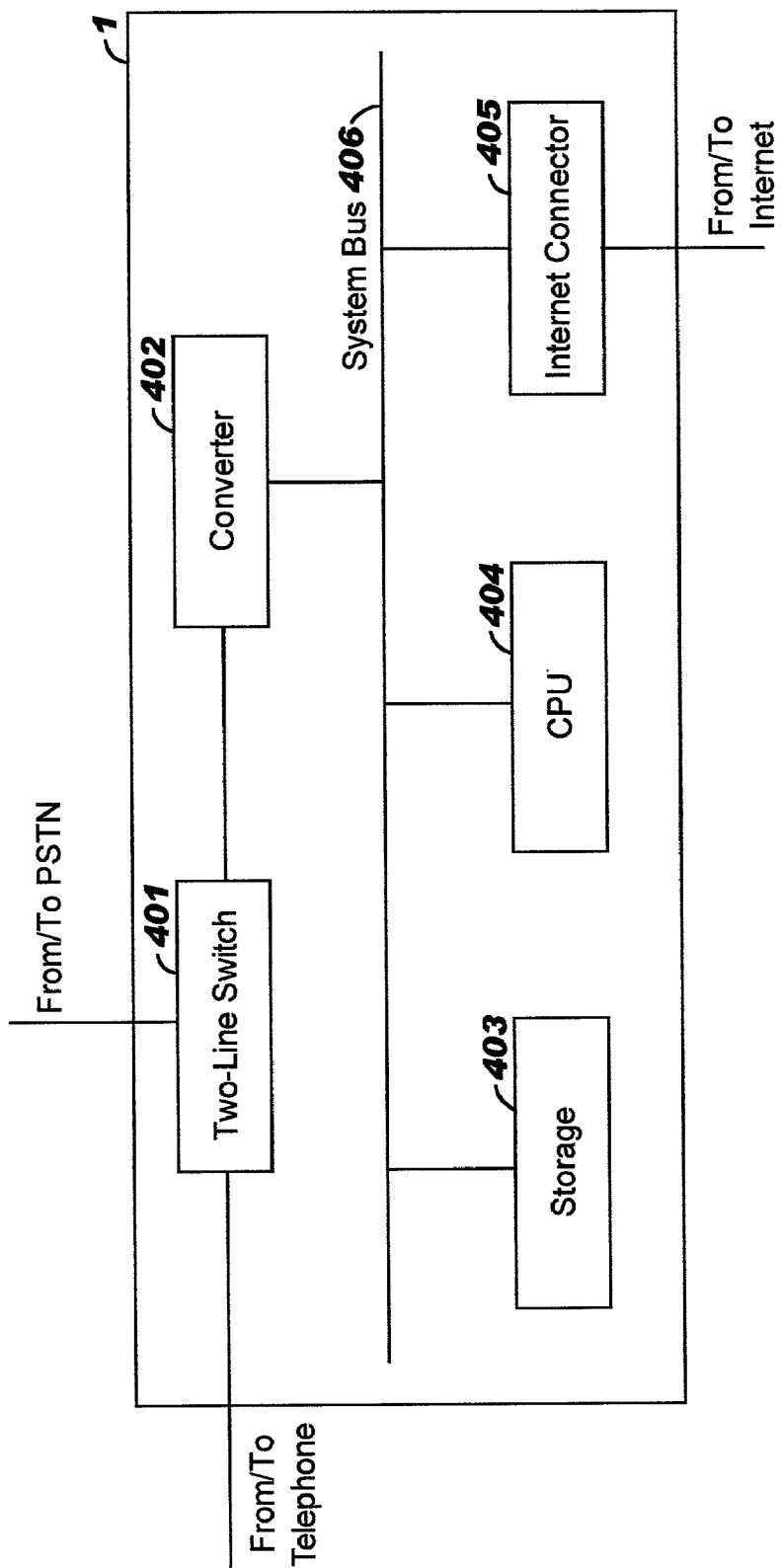
FIG. 4 is an exemplary block diagram of the net-aware telephone switch according to a first embodiment of the present invention.

FIG. 4 is an exemplary block diagram of the net-aware telephone switch 1 according to the present invention. As shown in FIG. 4, signals are transferred between the 2-line switch 401 and the telephone 2. The 2-line switch 401 operates, so that when it determines that a call from the telephone 2 is an IP phone call, it switches the communication path to the above IP phone path; and when it determines that the call is an ordinary phone call, it switches the communication path to the PSTN 6. The converter 402 is an analog/digital converter, with its analog side connected to the two-line switch 401 and the digital side connected to a system bus 406 (described below), and is responsible for converting signals between analog form suited to the telephone 2 and digital form suited to other parts of the net-aware telephone switch 1. It will be understood by those skilled in the art that when the telephone 2 can handle digital signals, the converter 402 will not be necessary. The CPU 404 coordinates the operations of all the other parts of the net-aware telephone switch 1, and implements different functions by executing the module programs stored in the storage 403. The programs may include, for example, the operating system managing the hardware in the net-aware telephone switch 1, communications and application level interface and the net-aware application software. The detailed operations of the CPU 404 will be discussed later.

The Internet connector 405 links the net-aware telephone switch 1 with the Internet. The Internet connector 405 may have various structures including the exemplary structures shown in FIGS. 8(a) to 8(c), based on the network accessed by the net-aware telephone switch 1.

Figure 8A:
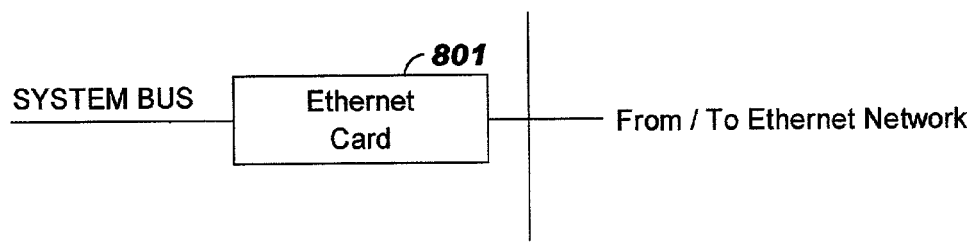
FIGS. 8(a) to 8(c) show exemplary Internet connectors having different structures.
Figure 8B:
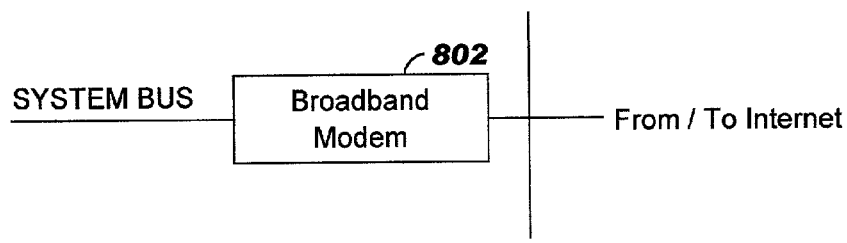
Figure 8C:
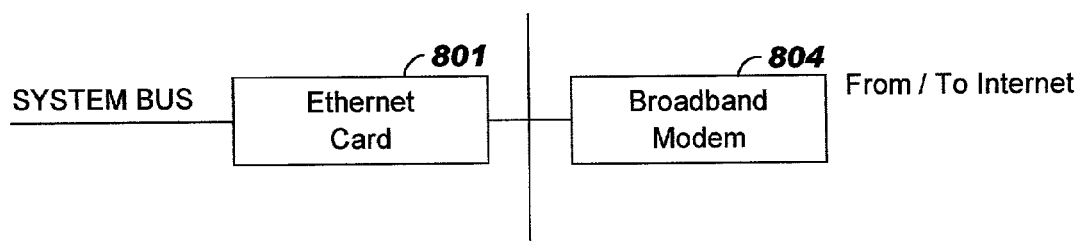

As shown in FIG. 8(a), the Internet connector 405 may include an Ethernet card 801 which connects with an Ethernet network providing Internet access service for the net-aware telephone switch 1. Such a connector is suitable to be used in the LAN environment, since it can easily connect the net-aware telephone switch 1 with the Internet. As shown in FIG. 8(b), the Internet connector 405 may include a broadband modem 802, such as a Cable Modem, which connects with a broadband network, for example a Cable network providing Internet access service for the net-aware telephone switch 1. As shown in FIG. 8(c), instead of connecting with a LAN, the Ethernet card 801 may connect with a broadband network through an external broadband Modem 804. The exemplary connection styles shown in FIGS. 8(b) and 8(c) are especially suited for use in areas where broadband networks are popular.

Those skilled in the art will understand that the Internet connector 405 may have other connection manners, so far as it connects the net-aware telephone switch 1 with the broadband network. For example, the Internet connector 405 may include a wireless modem if the LAN is wireless or for accessing a satellite system. In addition, the Internet connector 405 may include DSL modem to connect with a digital subscriber line.

The system bus 406 connects all the parts of the net-aware telephone switch 1 with each other, and transfers instructions and data among them.

Figure 5:
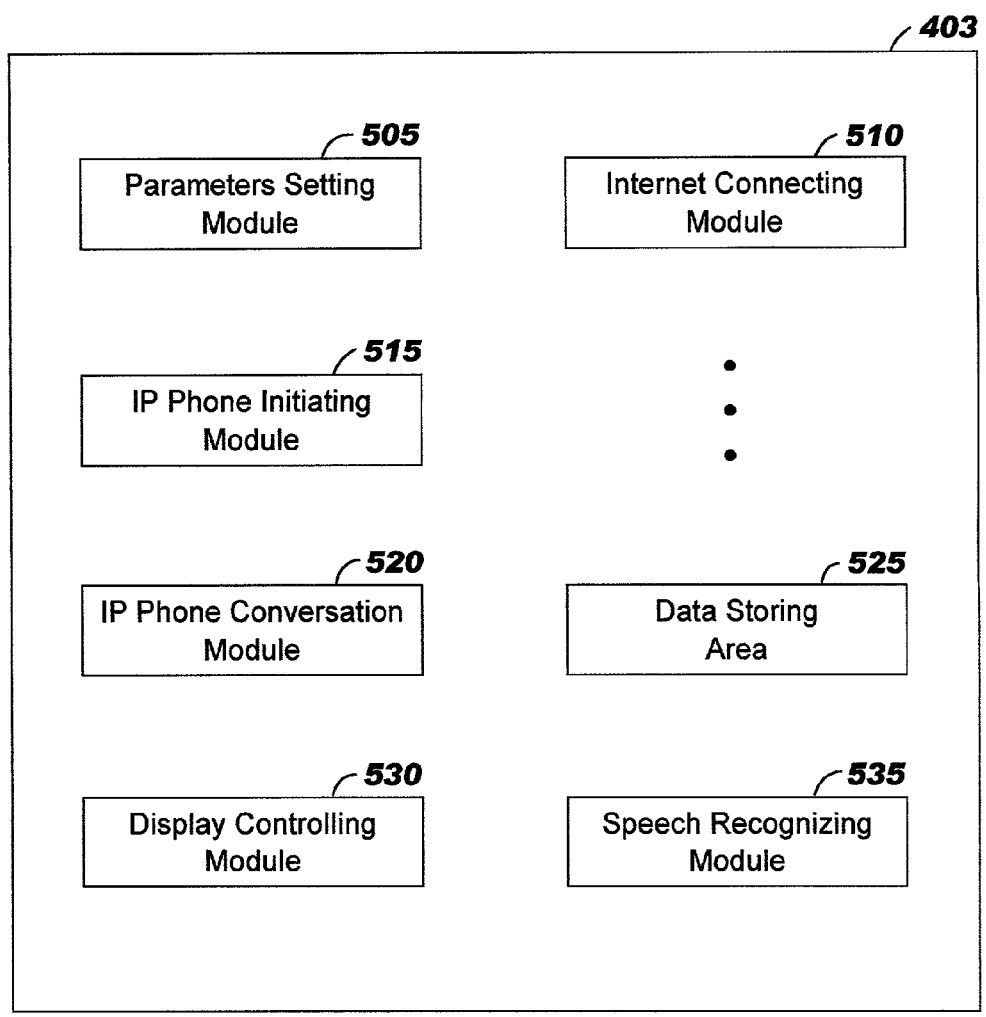
FIG. 5 shows module blocks stored in the storage of the net-aware telephone switch.

FIG. 5 shows the modules stored in the storage 403.

The parameters setting module 505 operates to direct the user of the telephone 2 to input the parameters needed for establishing an Internet connection with the ISP, for example, the IP address of the user himself, the IP Network Mask value, the address of the access router and the address of the server of the access DNS, and so forth; and the parameters needed for connecting with an ITP providing IP phone service for the user, for example, the address of the ITP; and the ID of the user, his/her passwords and so on. Those skilled in the art will understand that if the IP address of the user is dynamically distributed by a DHCP server, it is not necessary to input the IP address of the user. The parameters input by the user may be stored in the storage 403. Also, the parameters may be stored in the smart card as described below.

In practice, the above parameters setting module 505 may be called and operated by the CPU 404. The user can simply input the parameters by the telephone 2, in known manner, or by an input device as described below.

The Internet connecting module 510 operates to establish an Internet connection between the net-aware telephone switch 1 and the Internet based on the parameters for accessing the Internet stored in the storage 403. The IP phone initiating module 515 operates to establish the link between the net-aware telephone switch 1 and the ITP providing IP phone service for the user. The IP phone conversation module 520 operates so as to compress and encapsulate the digital data into TCP/IP packets for communicating through the Internet, or to decompress and combine the TCP/IP packets from the Internet, and combine the data into digital voice data suitable to the net-aware telephone switch 1. The data storing area 525 is used to temporarily store the user's voice data and the parameters set by the parameters setting module 505. Those skilled in the art will understand that the storage 403 according to the invention may also store other functional modules to be called and executed by the CPU 404 if necessary. The above modules may be operated by the CPU 404.

Figure 6:
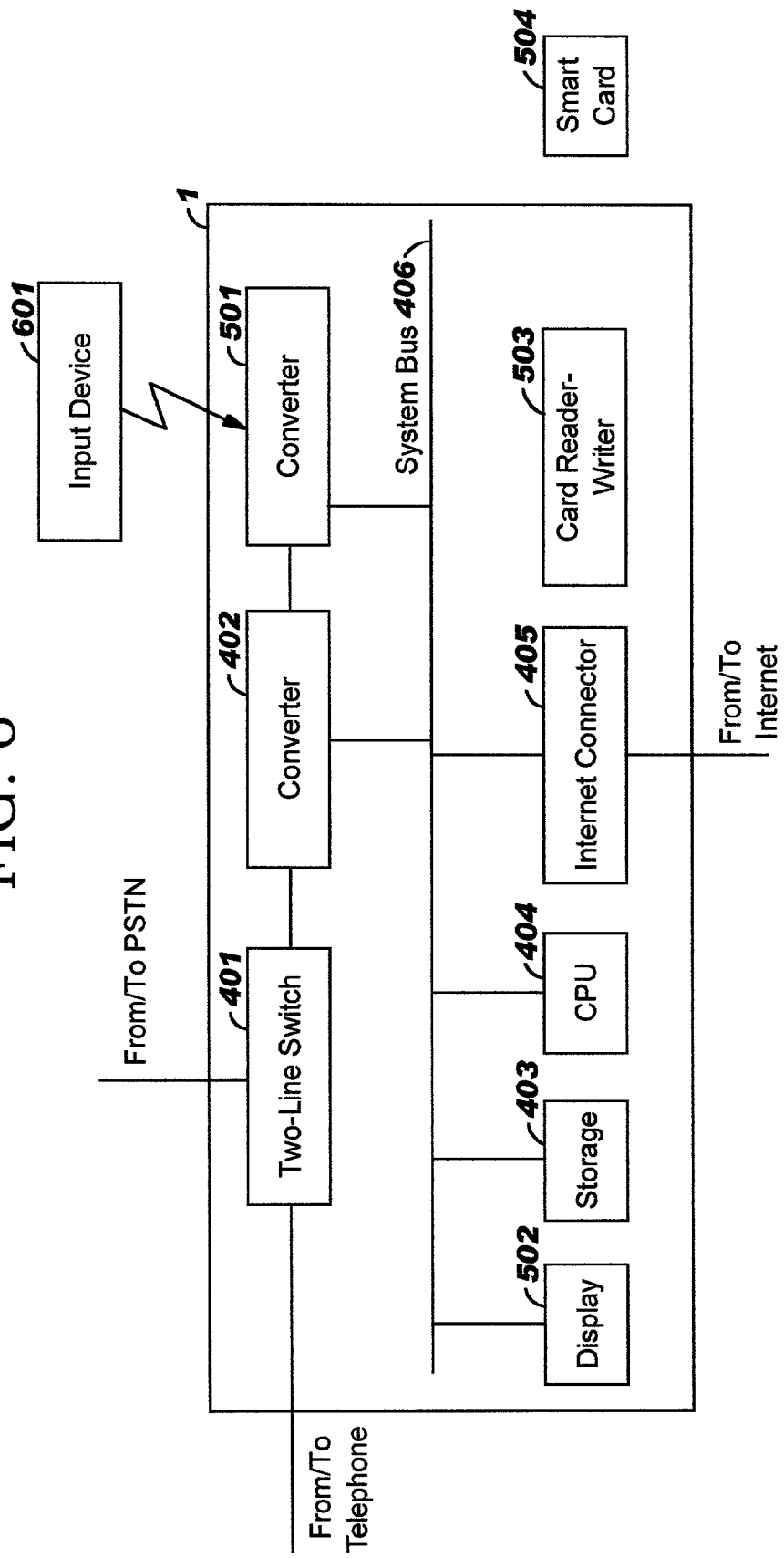
FIG. 6 shows an exemplary block diagram of the net-aware telephone switch according to a second embodiment of the invention.

FIG. 6 shows an exemplary block diagram of the net-aware telephone switch 1 according to a second embodiment of the invention. The net-aware telephone switch 1 in this embodiment is especially suitable to be used in a public environment such as a company, or a campus, since security is enhanced by using a card reader-writer to authenticate the user's validation.

In FIG. 6, the same parts as those of FIG. 4 have the same reference numerals, and their descriptions are omitted. Compared with the structure shown in FIG. 4, the second embodiment adds a wireless port 501, a display 502, a card reader-writer 503, and a smart card 504.

In this second embodiment, the user may input the parameters into the net-aware telephone switch 1 by an external input device 601 such as a Personal Digital Assistant (PDA).

The wireless port 501 provides a wireless connection between the input device 601 and the components in the net-aware telephone switch 1. The wireless port for implementing this function may include an infrared transceiver, a Bluetooth transceiver or other transceivers adopting wireless communication techniques.

In the second embodiment of the invention, the parameters for establishing the connection with the ITP, and the user's ID and password for accessing the ITP are stored in the smart card 504, which is a card capable of being written or read. The user may put data relative to all the ITPs which he/she can access into one smart card.

In response to instructions from the CPU 404, the card reader-writer 503 writes the data into the smart card 504 inserted into it, or reads data from the smart card 504. Specifically, when the CPU 404 detects that there are data input by the input device 601 and sent by the wireless port 501, it further checks if the data are relative to an ITP, and if yes, it transfers data to the card reader-writer 503, which then writes the data into the smart card 504. In addition, when the user initiates the connection with the ITP, the parameters about the desired ITP and the user's authentication information are read out from the smart card 504 by the card reader-writer 503, and transferred to the CPU 404, which then utilizes them to establish the connection with the ITP.

In the second embodiment, before establishing the connection with the ITP, the CPU 404 first receives the parameters about the ITP and the user's authentication information from the card reader-writer 503. Therefore, if there is no smart card 504 inserted into the card reader-writer 503, or if the parameters read from the smart card 504 inserted are not correct, the net-aware telephone switch 1 will not be able to connect with the corresponding ITP, thus preventing an unauthorized user from accessing the IP phone service.

Furthermore, the net-aware telephone switch 1 may include a display 502, which displays the operational status of the net-aware telephone switch 1 to the user, and there may be a display controlling module 530 (shown in FIG. 5) in the storage 403 for controlling the display 502.

Figure 7:
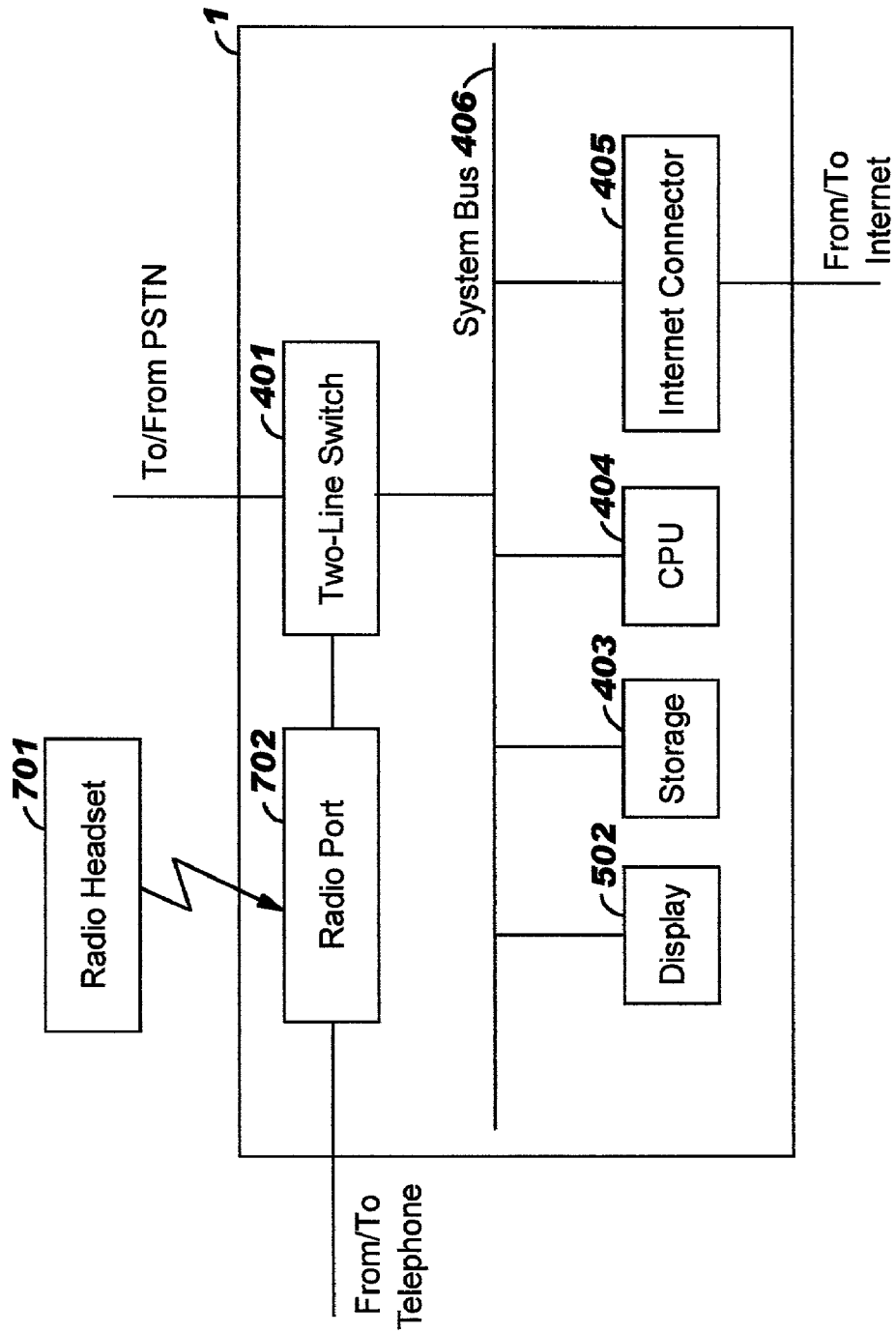
FIG. 7 shows an exemplary block diagram of the net-aware telephone switch according to a third embodiment of the invention.

FIG. 7 shows an exemplary block diagram of the net-aware telephone switch 1 according to a third embodiment of the invention. In FIG. 7, the same parts as those of FIG. 4 have the same reference numerals, and their descriptions are omitted. Instead of the ordinary telephone 2, a radio headset 701 is used. The radio headset 701 may communicate with the net-aware telephone switch 1 via a radio port 702, which may be an infrared port, Bluetooth port or other port adopting radio communication or other wireless techniques. A speech recognizing module 535 (shown in FIG. 5) may be included in the storage 403 (or counterpart hardware) for recognizing spoken commands of the user.

Now the operations of the net-aware telephone switch 1 will be discussed in details in connection with the FIGS. 9 to 17.

The operations of the net-aware telephone switch 1 may be executed mainly by the CPU 404 by calling the modules stored in the storage 403.

1. Setting the Parameters 1.1 Setting the ISP Parameters

Figure 9:
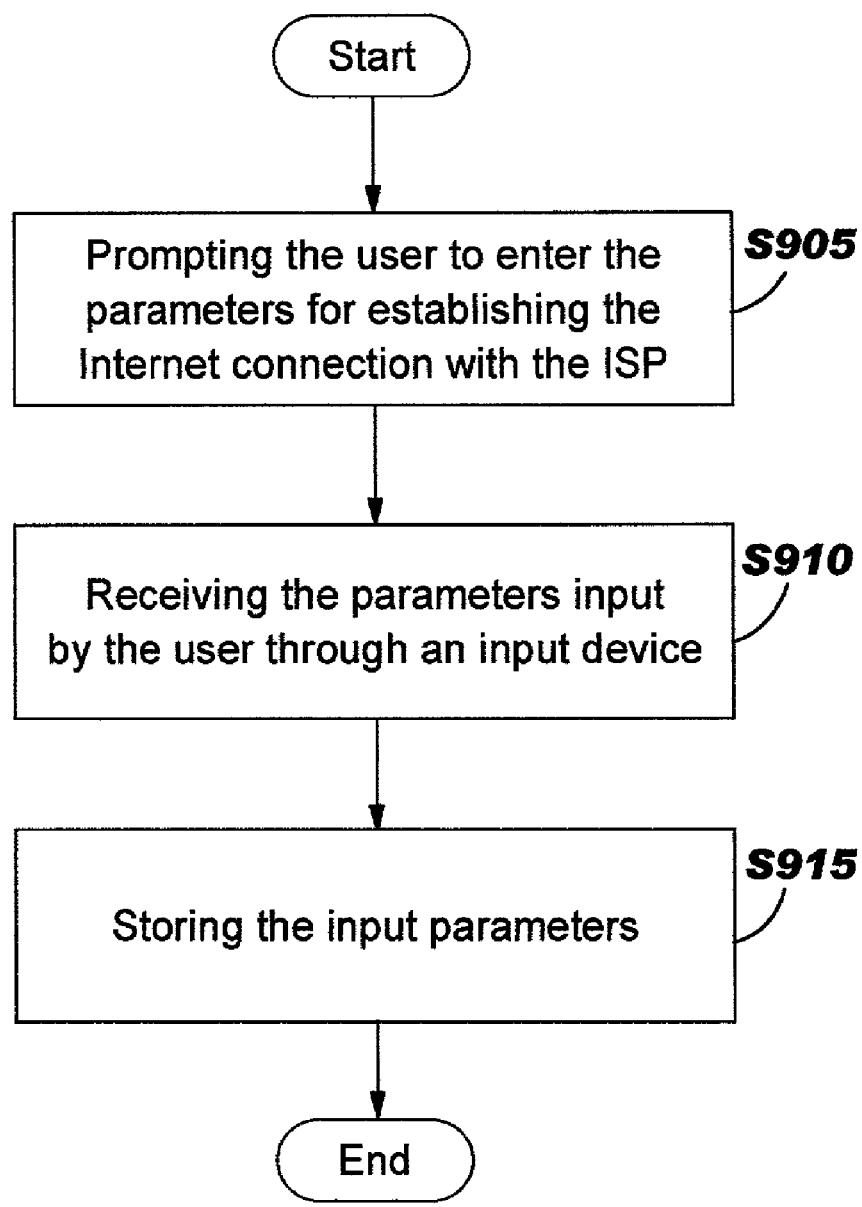
FIG. 9 shows an exemplary flow chart of setting the ISP parameters according to the invention.

FIG. 9 shows an exemplary flow chart for setting the ISP parameters according to the invention, which is implemented by the parameters setting module 505. Those skilled in the art will understand that this process need be executed only one time, as long as the ISP providing the Internet access service for the net-aware telephone switch 1 is not changed.

At S905, the CPU 404 prompts the user to enter the parameters for establishing the Internet connection with the ISP, for example, by speaking to the user through the receiver of telephone 2, or by displaying a prompting message in the display 502. In response to the prompt, the user inputs the parameters for establishing the Internet connection with the ISP through the input device 601 or the telephone 2. The parameters may be for example, the IP address of the user himself, the IP Network Mask value, the address of the access router of the ISP and the address of the server of the access DNS of the ISP. In addition, if required, the user may further input his ID number or password and so forth, for authentication. Then at S910, the CPU 404 receives the input parameters and/or authentication data through the radio port 501 or the 2-line switch 401 and/or converter 402. Then, at S915, the CPU 404 stores the input data into the data storing area 525 in the storage 403. The process for setting the ISP parameters then ends.

1.2 Setting the ITP Parameters

Figure 10:
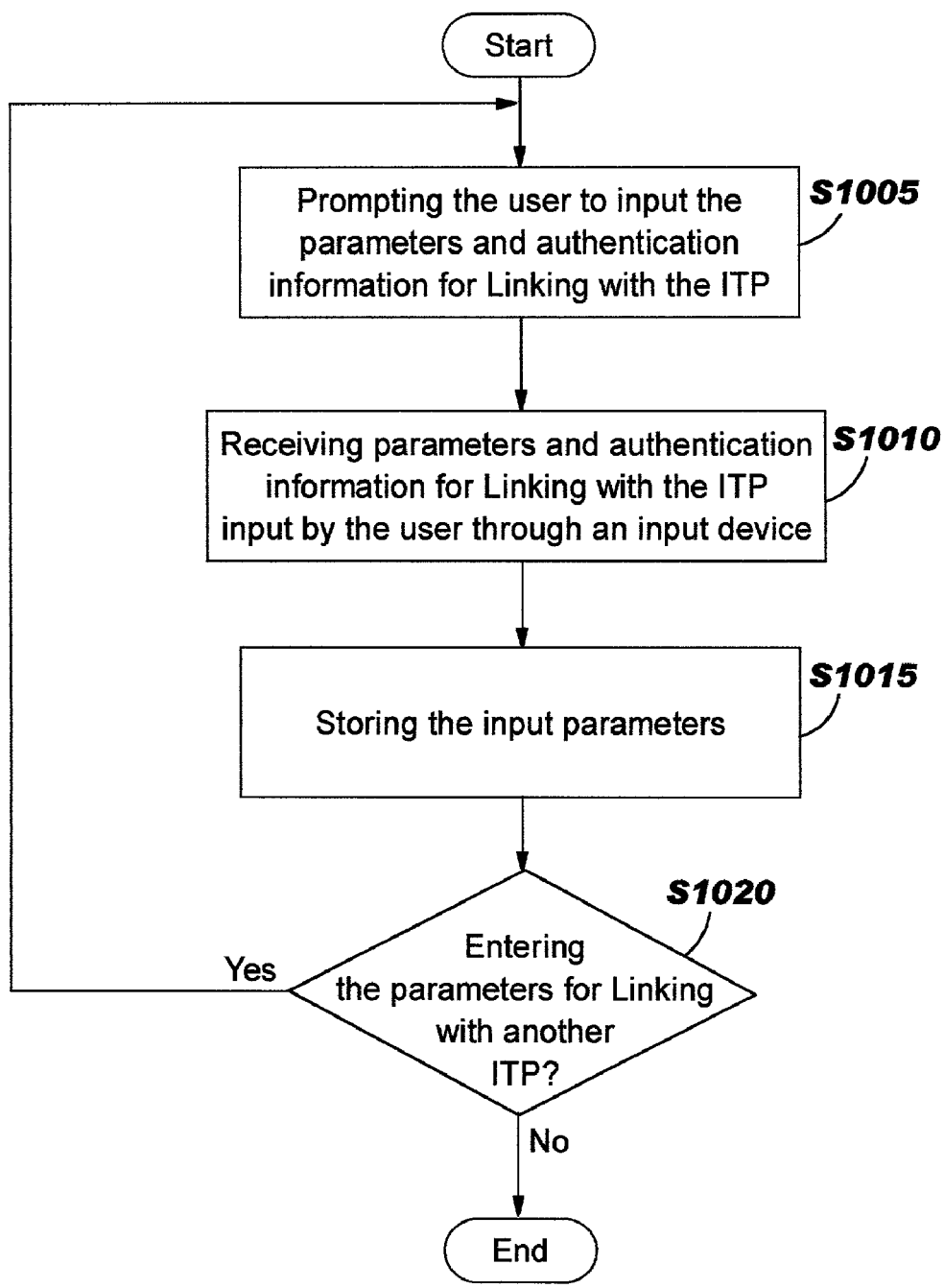
FIG. 10 shows an exemplary flow chart of setting the ITP parameters according to the invention.

FIG. 10 shows an exemplary flow chart for setting the ITP parameters according to the invention, which is also implemented by the parameters setting module 505. Those skilled in the art will understand that this process need be executed only one time, as long as the ITP(s) providing the Internet telephone service for the user of the net-aware telephone switch is/are not changed.

At S1005, the CPU 404 prompts the user to enter the parameters for establishing the Internet connection with the ITP, for example, by speaking to the user through the receiver of telephone 2, or by displaying a prompting message in the display 502. In response to the prompt, the user inputs the parameters for linking with the ITP through the input device 601 or telephone 2. The parameters may be for example, the IP address of the ITP. In addition, the user may need to input his/her ID number or password and so forth for authentication by the ITP. Then at S1010, the CPU 404 receives the input parameters and authentication data through the radio port 501 or the 2-line switch 401 and converter 402. Then at S1015, the CPU 404 stores the input data into the data storing area 525 in the storage 403.

At S1020, the CPU 404 inquiries the user whether he/she wants to input parameters about other ITP he/she can access. And if so, the process returns to S1005; if not, the process for setting the ITP parameters ends.

Figure 11:
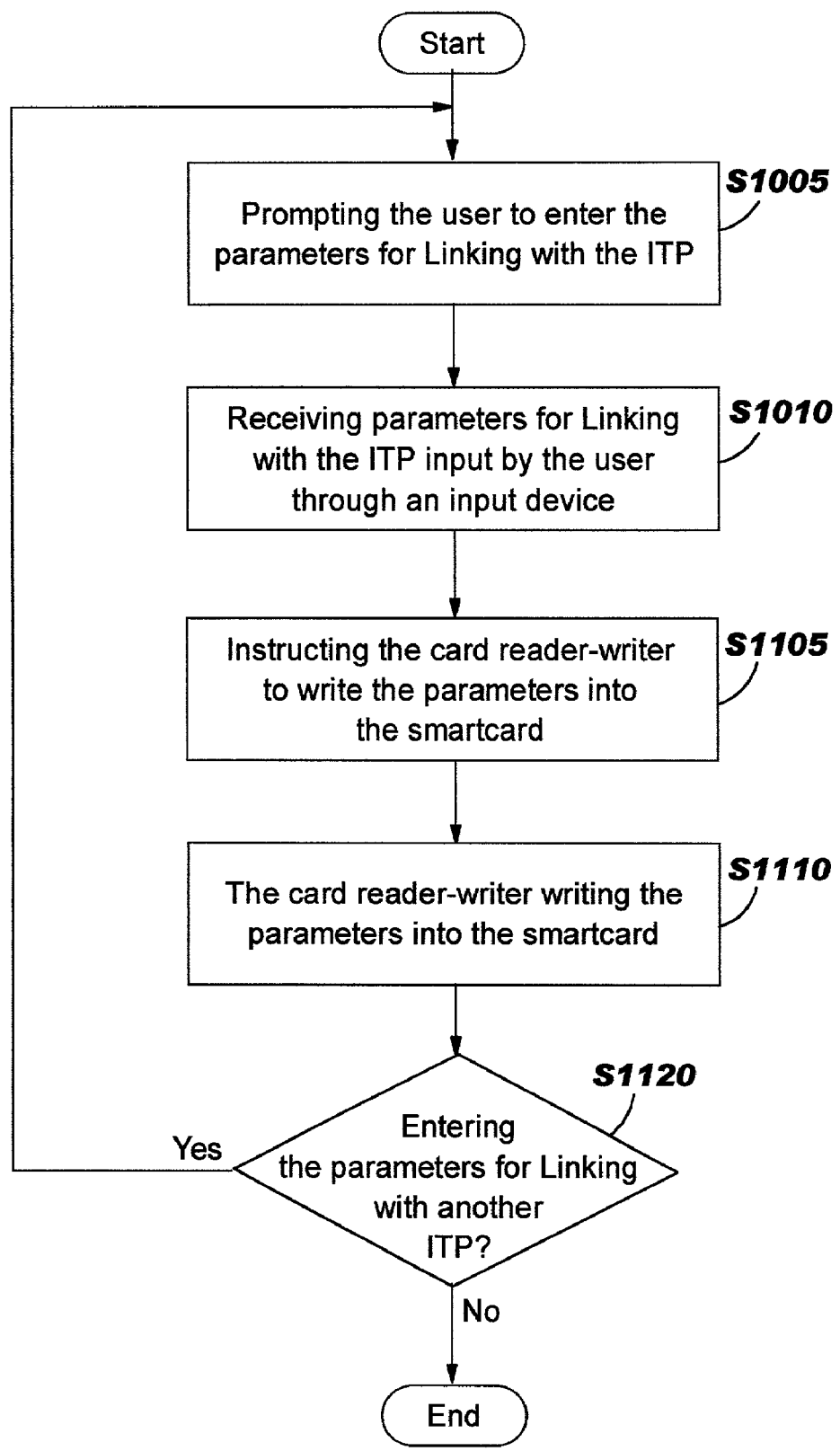
FIG. 11 shows another exemplary flow chart of setting the ITP parameters in the invention.

FIG. 11 shows another exemplary flow chart for setting the ITP parameters. The same steps as those of FIG. 10 are marked with the same reference numerals, and their descriptions are omitted. In this process, instead of storing the input data into the storage 403, they are stored in the smart card 504. That is, after receiving the input data (S1010), the CPU 404 instructs the card reader-writer 503 to write the input data into the smart card 504, at S1105. At S1110, in response to the instruction, the card reader-writer 503 writes the input data into the smart card 504.

1.3 Setting the Phone Mode

Figure 12:
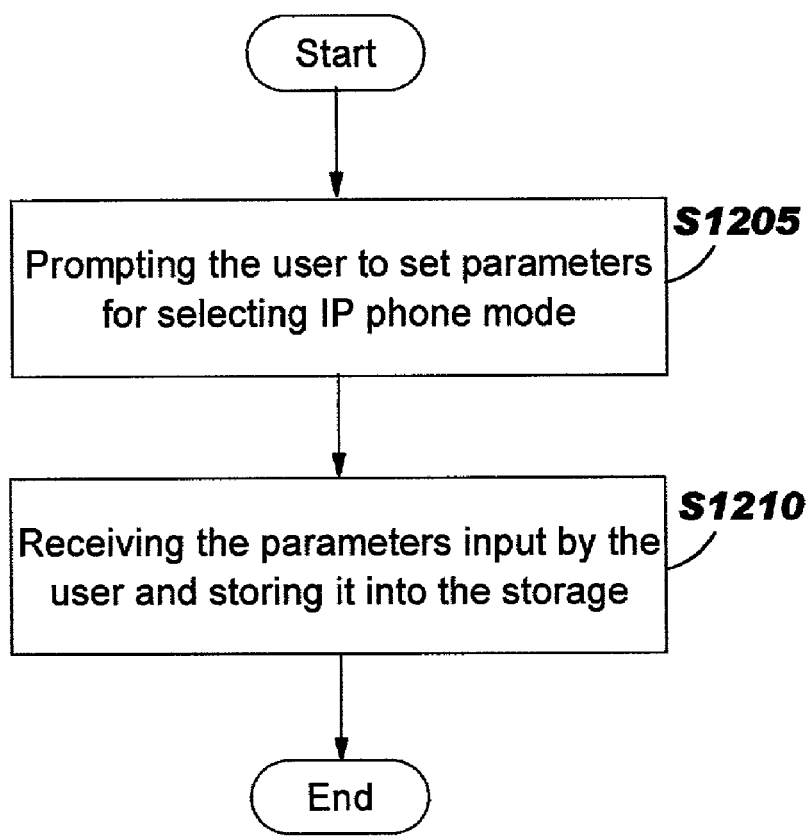
FIG. 12 shows an exemplary flow chart of setting the phone modes parameters for the user.

The parameters setting module 505 further sets the phone mode parameters for the user, as shown in FIG. 12. The net-aware telephone switch 1 according to the invention enables the user to receive or send calls from/to both the Internet and the PSTN. Therefore, it is necessary for the net-aware telephone switch 1 to recognize which phone mode it should use, ordinary phone mode (PSTN phone mode), or Internet phone mode (IP phone mode), when a user dials a phone call.

At S1205, the CPU 404 prompts the user to set an indicator such as a special symbol for requesting the IP phone mode. In response to this, the user inputs the symbol for requesting the IP phone mode, for example "*". After receiving the symbol, the CPU 404 stores it into the data storing area 525 of the storage 403, at S1210, and then the process ends.

The purpose for setting the phone mode parameter is that every time the net-aware telephone switch 1 is powered on, the CPU 404 transfers the symbol representing the IP phone mode to the 2-line switch 401 which holds it until the net-aware telephone switch 1 is powered off. When the user dials a phone call, the 2-line switch 401 detects if the user input the symbol by comparing the input data with the symbol it holds. If the user inputs the special symbol, the 2-line switch 401 switches the path to the IP phone path, else it switches the path to the PSTN. Those skilled in the art will understand that there are other ways to make the net-aware telephone switch recognize the phone mode, for example by storing the special symbol in non-volatile memory.

2. Initiation of the Net-Aware Telephone Switch 2.1. Connecting with the ISP

In order to receive or send IP phone calls, the net-aware telephone switch 1 should first link to the Internet by accessing an ISP, which is accomplished by executing the Internet connecting module 510.

FIG. 13 shows an exemplary flow chart for establishing connection with the ISP.

At S1305, the CPU 404 reads out the parameters about the ISP providing Internet access service for the net-aware telephone switch 1 from the data storing area 525. Then the CPU 404 transmits a request for accessing the Internet to the ISP through the Internet connector 405, together with the data read out, at S1310. At S1315, the ISP detects if the user is authorized or not, and if the user is authorized, the process advances to S1325 and the ISP connects the net-aware telephone switch 1 to the Internet; else the process advances to S1320 and the ISP returns rejection information to the user.

It will be understood by those skilled in the art that the above connection operation may be automatically executed when the net-aware telephone switch 1 is powered on, or executed according to the user's instruction.

2.2 Connecting with the ITP

In order to receive or send IP phone calls, it is not enough for the net-aware telephone switch 1 to access the Internet, it should further connect to an ITP providing IP phone service.

Figure 14A:
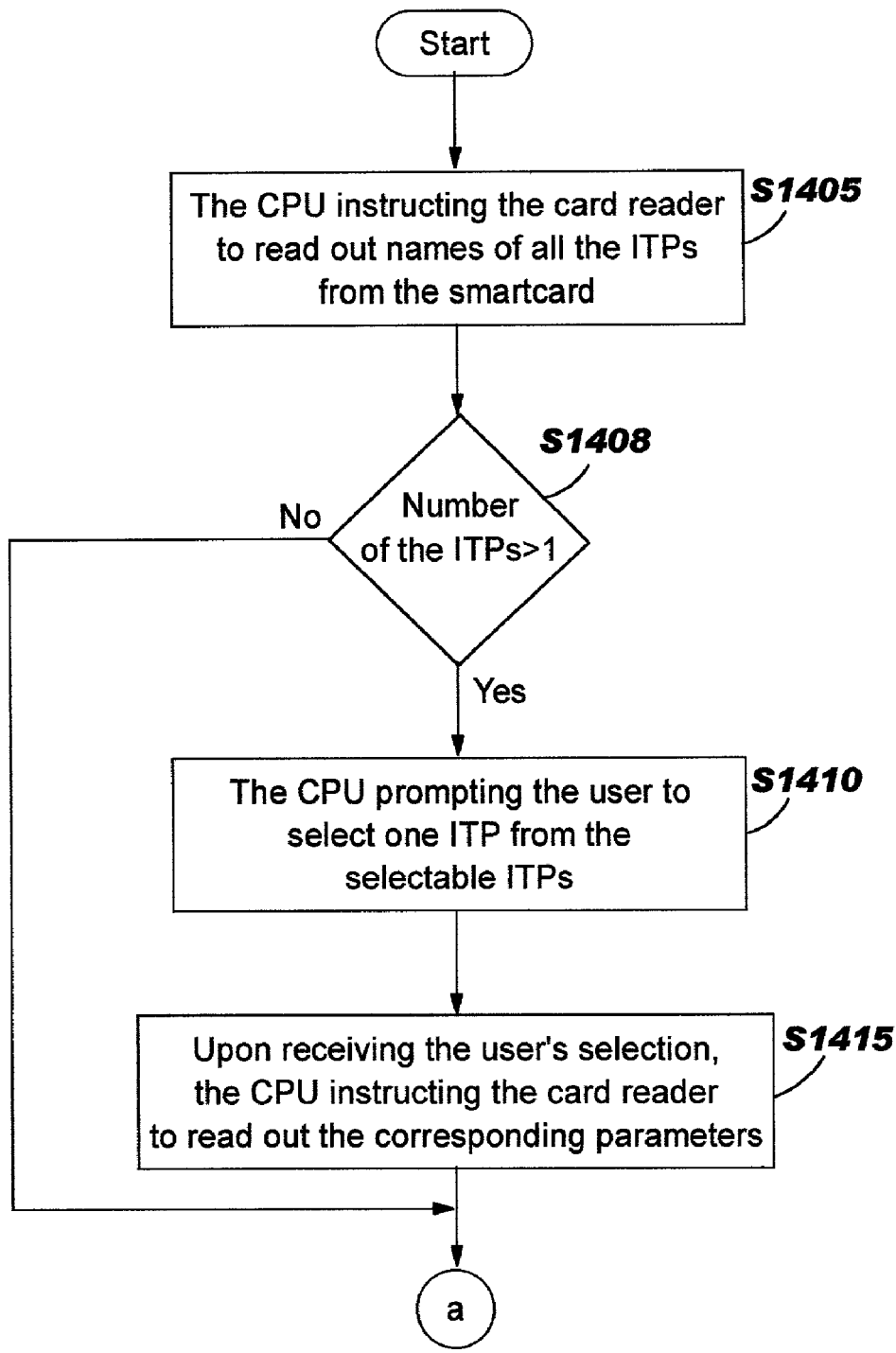
FIGS. 14A–14B show an exemplary flow chart of establishing connection with an ITP.
Figure 14B:
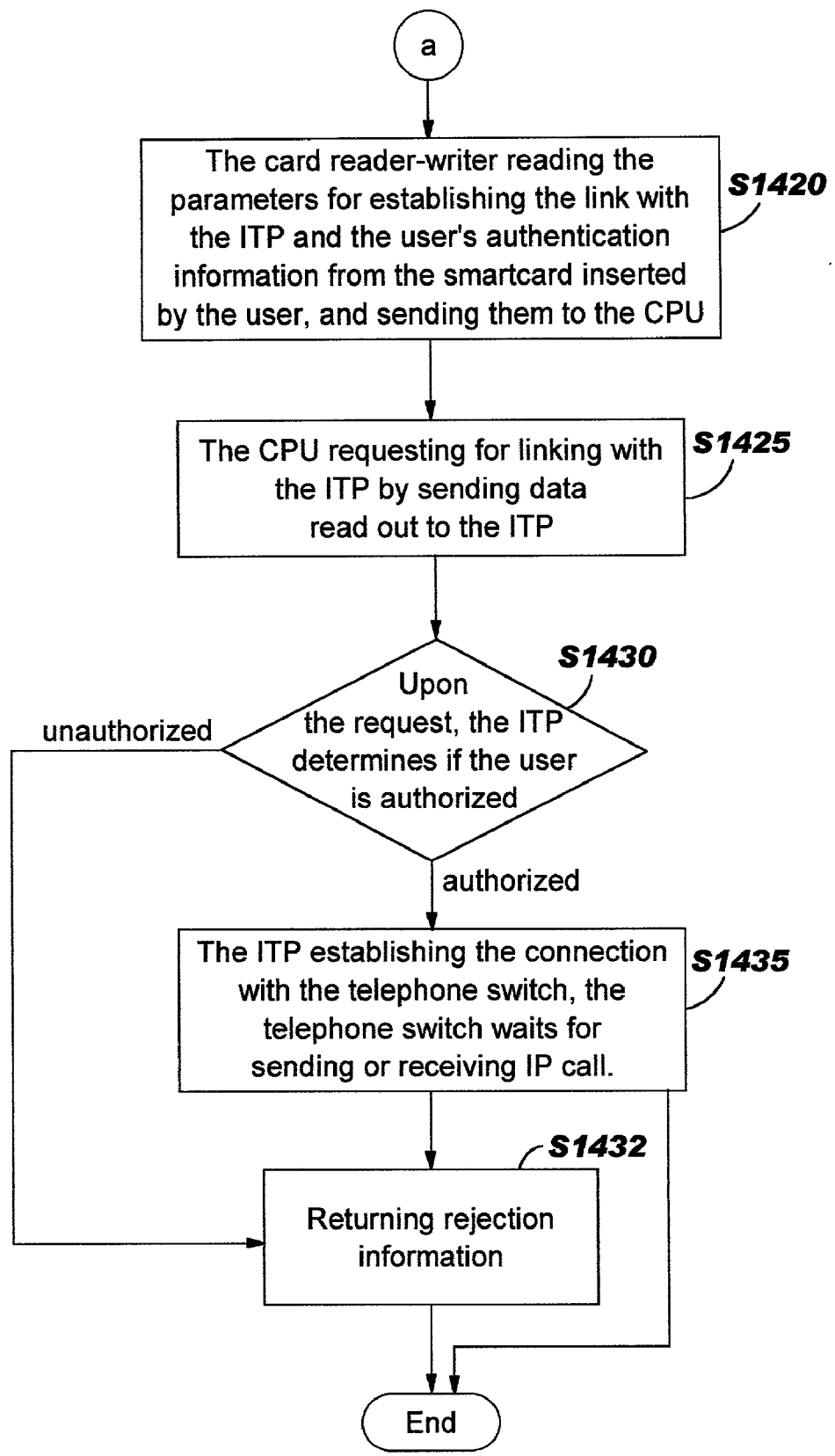

FIGS. 14A–14B show an exemplary flow chart for establishing connection with an ITP according to the operation of the IP phone initiating module 510, which is illustrated by the card reader-writer 503 reading out the parameters of the ITP from the smart card 504, for convenience. However, the parameters may instead be read out from the data storing area 525 if they are recorded in the area 525. In this latter case, the steps 1405 to 1415 will be omitted.

At S1405, the CPU 404 instructs the card reader-writer 503 to read out from the smart card 504, all the ITPs' names capable of being accessed by the owner of the smart card 504. At S1408, the CPU 404 detects if the number of the ITPs is more than 1, and if not, the process advances to S1420; else the process advances to S1410. At S1410, the CPU prompts the user to select one ITP from the ITPs read out.

Then, in response to the prompt, the user selects one ITP. At S1415, in response to the user's selection, the CPU 404 instructs the card reader-writer 503 to read out from the smart card 504, the parameters about the selected ITP, and the user's security information such as his/her ID or password. At S1420, the card reader-writer 503 reads out the parameters about the selected ITP and the user's security information from the smart card 504, and sends them to the CPU 404 through the system bus 406. At S1425, the CPU 404 transmits the data received from the reader-writer 503 to the requested ITP. At S1430, upon receiving the data, the ITP detects if the user is authorized or not, and if the user is authorized, the process advances to S1435, the ITP establishes the connection with the net-aware telephone switch 1, the net-aware telephone switch 1 waits for receiving or sending an IP phone call, and the process ends; if the user is not authorized, the process advances to S1432, the ITP returns rejection information to the net-aware telephone switch 1, and the process ends.

As noted in the above description, even after the net-aware telephone switch 1 has connected to the Internet, an unauthorized user still cannot dial IP phone calls since he/she cannot connect to the ITP. This is an advantage of the invention, that is the high security.

In addition, security may also be augmented by providing a digital certificate to the user by the ITP. In this case, the user may send the digital certificate information recorded in the storage 525 or the smart card 504 to the ITP for authentication, in addition to the password and the userid.

2.3 Dialing a Phone Call Through the Net-Aware Telephone Switch 1

The process of dialing a phone call through the net-aware telephone switch 1 will be discussed now. For convenience, it will be illustrated by using the analog telephone 2 as in the first embodiment.

Figure 15A:
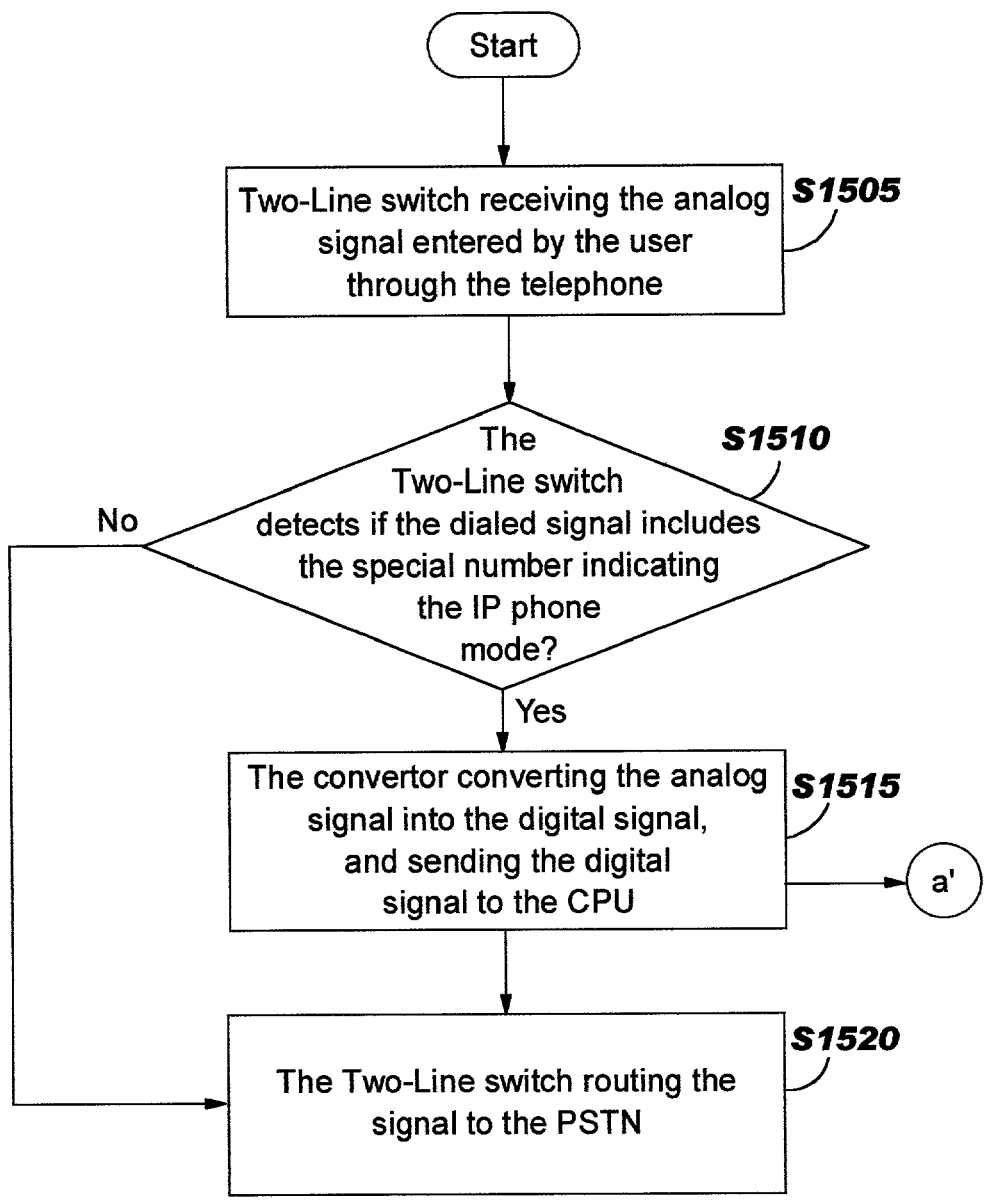
FIGS. 15A–15B show an exemplary flow chart of dialing phone calls by the user.
Figure 15B:
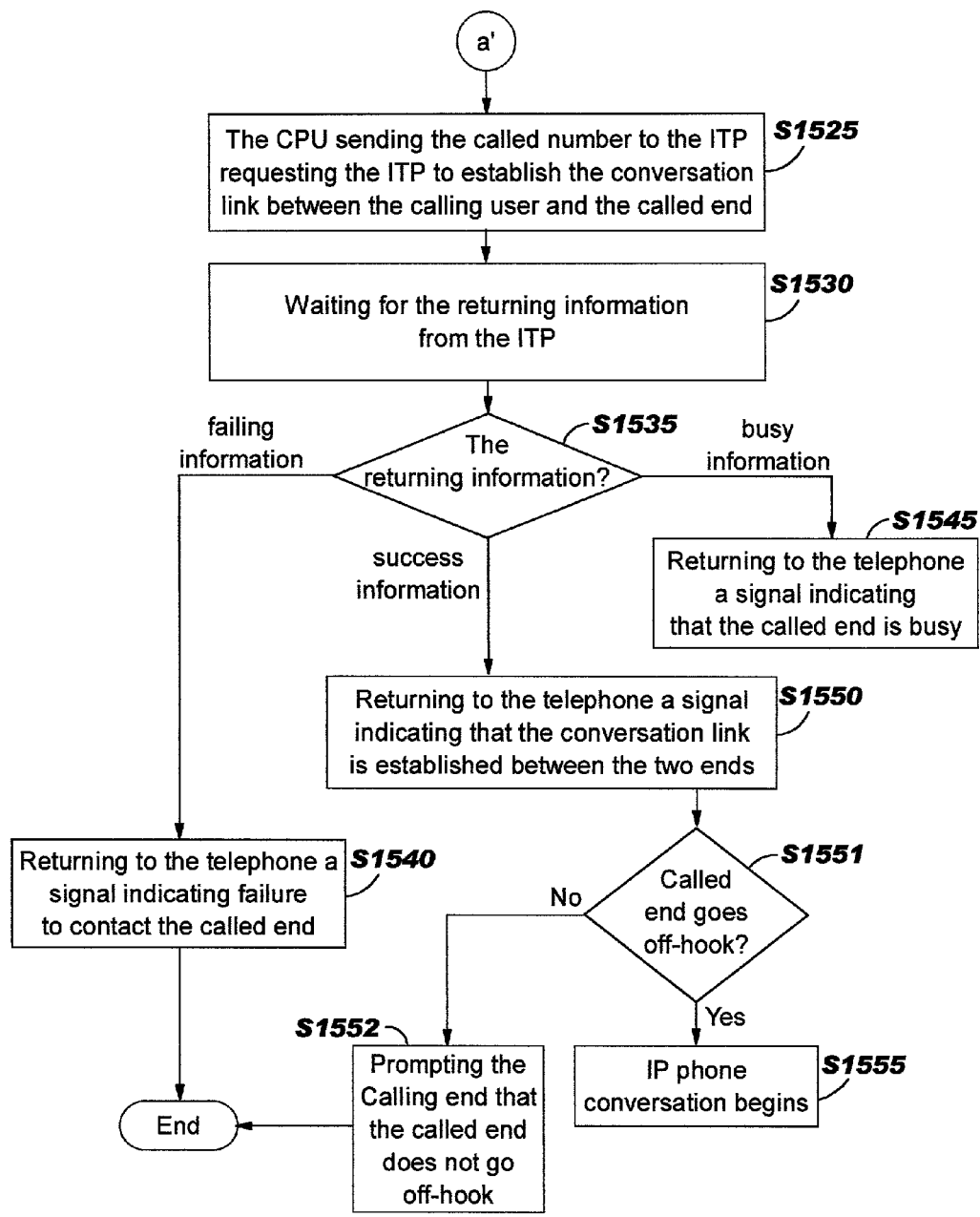

FIGS. 15A–15B show an exemplary flow chart for dialing a phone call by the user.

At S1505, the 2-line switch 401 receives the analog call signal input by the user (referred hereafter as the calling end) through the telephone 2, which includes the phone number of the called end and the phone mode if necessary. At S1510, the 2-line switch 401 detects if the received analog call signal includes the special symbol indicating that the call is an IP phone call, the special symbol for example is "*" by comparing the analog call signal with the reference special symbol it holds. If it detects that the call is an IP phone call, the process advances to S1515, else advances to S1520, and the 2-line switch 401 switches the phone mode to be the ordinary phone mode and routes the signal to the PSTN.

At S1515, the converter 402 converts the analog call signal into a digital signal, and transfers it to the CPU 404.

At S1525, The CPU 404 transmits the phone number of the called end to the ITP through the Internet connector 405, and instructs the ITP to establish a conversation link between the calling end, that is, the user of the telephone 2, and the called end. Then at S1530, the net-aware telephone switch 1 waits for the ITP's return message. Upon receiving the ITP's return message, the CPU 404 detects its type at S1535. If the return message indicates that the ITP failed to establish the conversation link with the called end, the CPU 404 then returns to the telephone 2 a signal indicating that it failed to contact with the called end, at S1540, and the process then ends. If the return message indicates that the called end is busy, the CPU 404 returns to the telephone 2 a signal indicating that the called end was busy, at S1545, and then the process ends. If the return message indicates that a conversation link has been established, the CPU 404 will then return to the telephone 2 a signal indicating that the conversation link has been established and wait for the called end to go off-hook, at S1550. At S1551, the CPU 404 detects if the called end has gone off-hook. If the called end fails to go off-hook in a predefined time period, the CPU 404 sends the user a signal indicating that the called end has failed to go off-hook at S1552, and the process ends. If the called goes off-hook the process advances to S1555, and the calling end and the called end begin to talk with each other.

Figure 16:
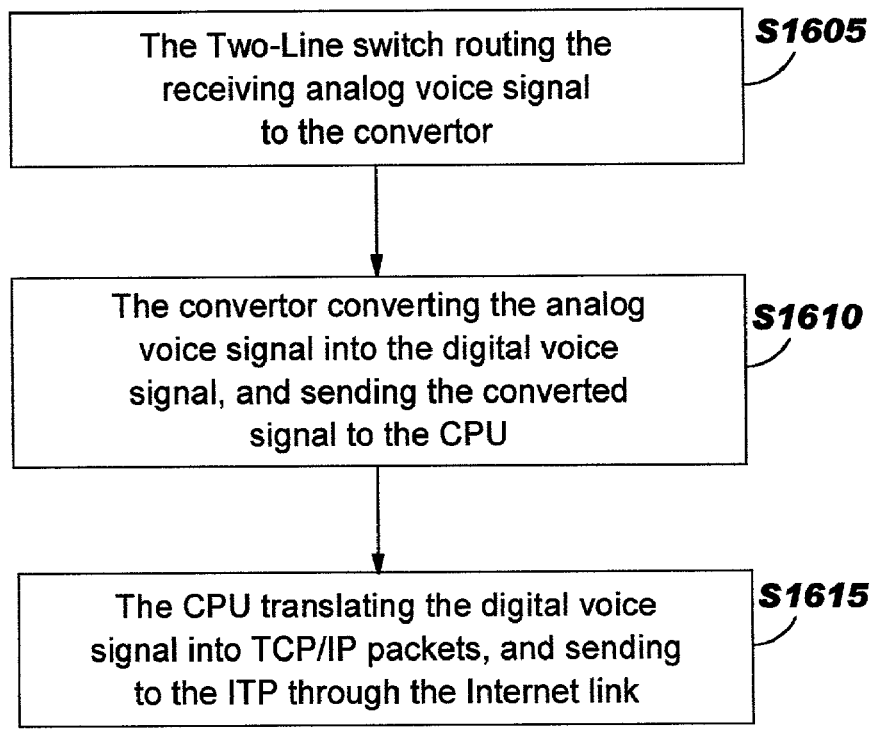
FIG. 16 shows an exemplary flow chart of data conversion process during the IP phone conversation.

FIG. 16 shows an exemplary flow chart of the process by which the net-aware telephone switch 1 handles the analog voice signals sent from the telephone 2 to the Internet according to the IP phone conversation module 520. Those skilled in the art will understand that voice packets sent from the Internet to the calling end may be handled in the reverse direction of the process.

As shown in FIG. 16, the 2-line switch 401 passes the analog voice signal input by the user through the telephone 2 to the converter 402, at S1605. At S1610, the converter 402 converts the analog voice signal into a digital voice signal, and transfers it to the CPU 404. At S1615, the CPU 404 converts the digital voice signal into TCP/IP packets, and sends the packets to the ITP through the Internet connector 405.

2.4 Receiving the IP Phone Call

Figure 17:
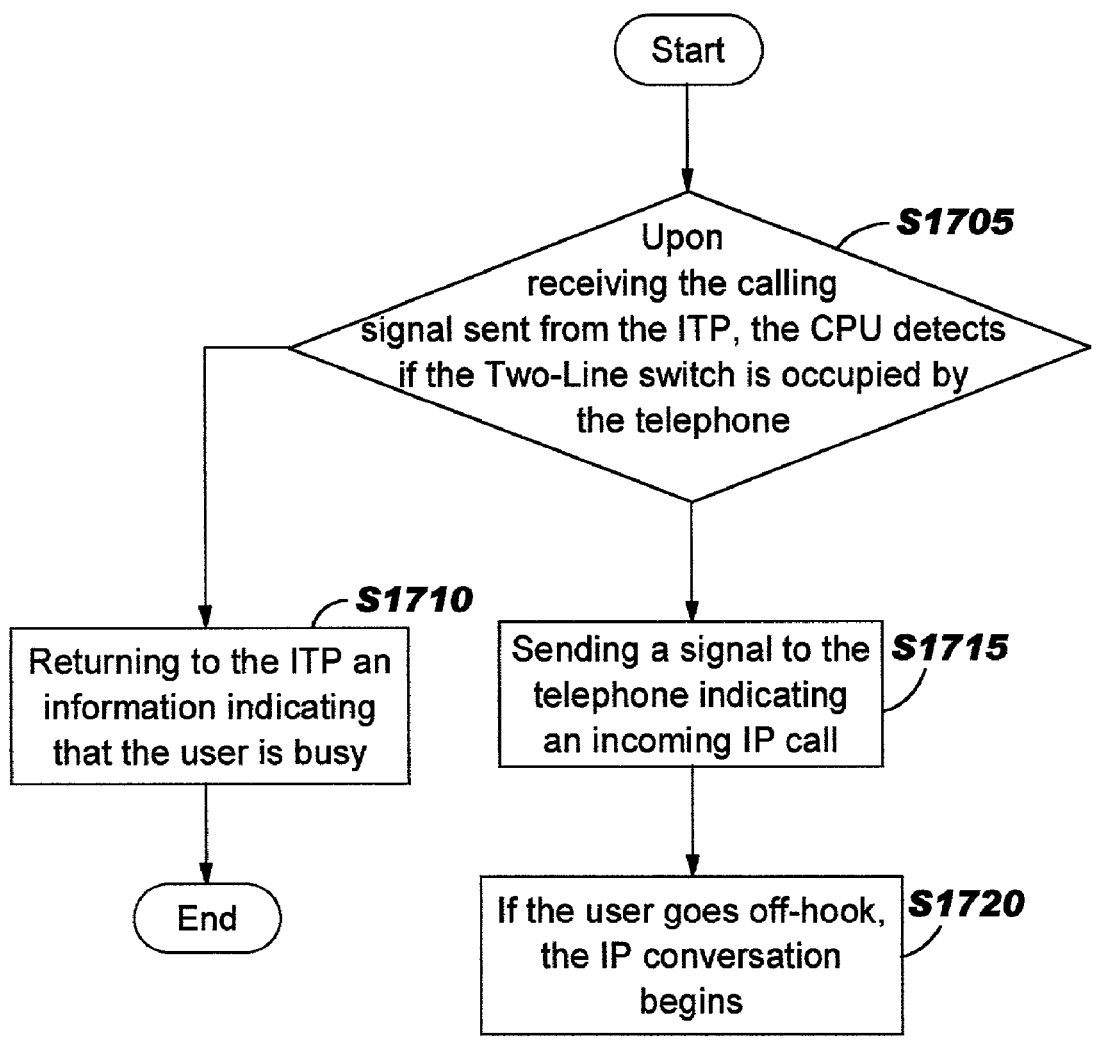
FIG. 17 shows an exemplary flow chart of receiving the IP phone call from the Internet.

FIG. 17 shows an exemplary flow chart for receiving the IP phone call from the Internet.

As shown in FIG. 17, when receiving the call from the ITP through the Internet connector 405, the CPU 404 detects if the 2-line switch 401 is occupied, at S1705. If the 2-line switch 401 is occupied, the CPU 404 returns to the ITP a signal indicating that the user's line is busy, at S1710. Upon receiving the signal, the ITP may prompt the calling end to leave voice mail for the called end in a known manner. In addition, if the 2-line switch 401 is not occupied, the CPU 404 sends a signal informing the called end that there is an IP phone call incoming. At S1720, if the called end goes off-hook, the conversation begins.

The above description illustrates how the analog telephone 2 receives or sends an IP phone call through the net-aware telephone switch 1. However, those skilled in the art will understand that if there is a phone call from the PSTN, the 2-line switch 401 connecting with the PSTN will directly route the call to the telephone 2 without doing any other process.

In addition, those skilled in the art will understand that if the telephone is a radio headset 701, the CPU will further use the speech recognizing process to determine instructions sent by the user through the headset. The description thereof is omitted here.

Although preferred embodiments of the invention have been described in detail, those skilled in the art will understand that various modifications, supplements, substitutes and similar changes can be made without departing from the scope of the invention, thus these changes are considered to be within the range of the invention defined in the appended claims.

I claim:

1. A net-aware telephone switch providing IP phone service for a user of a communication terminal, the net-aware telephone switch comprising:
 a two-line switch connecting with the communication terminal for switching outgoing calls between IP phone mode and PSTN phone mode;
 a CPU for sending and receiving IP phone mode calls to and from the net-aware telephone switch;
 storage for storing programs and data required for sending and receiving the IP phone mode calls;
 the storage further including a parameters setting module, operated by the CPU to direct the user to set parameters for establishing a connection with an Internet service provider and a connection with an Internet telephone provider, and to direct the user to set an indicator indicating IP phone mode; an Internet connecting module, operated by the CPU to establish the connection with the Internet service provider; an IP phone initiating module, operated by the CPU to establish the connection with the Internet telephone provider; and an IP phone conversation module, operated by the CPU to enable the user to talk with a called end in IP phone mode;
 an Internet connector for connecting the net-aware telephone switch with the Internet;
 a bus for connecting together the two-line switch, the CPU, the storage, and the Internet connector; and
 a smart card reader-writer for storing the parameters into a smart card inserted into the smart card reader-writer.

2. The net-aware telephone switch of claim 1, further comprising an A/D converter with an analog side connected with the two-line switch and a digital side connected with the bus, for converting telephone signals between analog form suited for the communication terminal and digital form suited for the net-aware telephone switch.

3. The net-aware telephone switch of claim 1, wherein the Internet connector includes an Ethernet card.

4. The net-aware telephone switch of claim 1, wherein the Internet connector includes a broadband modem.

5. The net-aware telephone switch of claim 1, wherein the Internet connector includes a DSL modem.

6. The net-aware telephone switch of claim 1, wherein the Internet connector includes a wireless modem.

7. The net-aware telephone switch of claim 1, further comprising a display for prompting the user for information.

8. The net-aware telephone switch of claim 1, further comprising a wireless port connected with the bus for receiving data input by the user through an input device.

9. The net-aware telephone switch of claim 8, wherein the wireless port includes an infrared transceiver.

10. The net-aware telephone switch of claim 8, wherein the wireless port includes a Bluetooth transceiver.

11. The net-aware telephone switch of claim 1, wherein a digital certificate is stored in the storage and sent to the Internet telephone provider for authentication.

12. The net-aware telephone switch of claim 1, wherein the parameters include an address of the Internet service provider and an address of the Internet telephone provider.

13. The net-aware telephone switch of claim 12, wherein the parameters further include a first password associated with the Internet service provider and a second password associated with the Internet telephone provider.

14. The net-aware telephone switch of claim 1, wherein a digital certificate is stored in the smart card and sent to the Internet telephone provider for authentication.

* * * * *